United States Patent
Ohashi

(10) Patent No.: US 10,249,011 B2
(45) Date of Patent: Apr. 2, 2019

(54) INFORMATION PROCESSING APPARATUS AND INFORMATION PROCESSING METHOD

(71) Applicant: FUJI XEROX CO., LTD., Tokyo (JP)

(72) Inventor: Jun Ohashi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 78 days.

(21) Appl. No.: 15/440,566

(22) Filed: Feb. 23, 2017

(65) Prior Publication Data

US 2018/0011712 A1   Jan. 11, 2018

(30) Foreign Application Priority Data

Jul. 8, 2016 (JP) .................. 2016-135865

(51) Int. Cl.
*G06F 9/50*       (2006.01)
*G06Q 50/18*      (2012.01)
*G06Q 10/00*      (2012.01)

(52) U.S. Cl.
CPC ............. *G06Q 50/18* (2013.01); *G06Q 10/00* (2013.01); *G06F 9/50* (2013.01)

(58) Field of Classification Search
CPC ........................................ G06F 9/44
See application file for complete search history.

(56) References Cited

FOREIGN PATENT DOCUMENTS

JP    2009-251754 A    10/2009

*Primary Examiner* — Charlie Sun
(74) *Attorney, Agent, or Firm* — Oliff PLC

(57) ABSTRACT

An information processing apparatus includes a specifying unit and an output unit. The specifying unit specifies, in a case where multiple pieces of first and second information have been accumulated, each piece of first information indicating a document and an order of processes of a certain operation performed on the document and a corresponding piece of second information indicating a result of the certain operation in terms of multiple items, either of the multiple items on the basis of an operation performed by a user. The output unit outputs a piece of first information corresponding to a piece of second information for which the result of the certain operation meets a condition in terms of the specified item among the multiple pieces of first and second information.

20 Claims, 13 Drawing Sheets

| APPLICATION-RELATED INFORMATION | DOCUMENT IDENTIFICATION INFORMATION | 0001-0000 |
| --- | --- | --- |
| | OPERATION TIME | 00:00:00 |
| | HISTORY OF OPERATORS' USER IDS | — |
| | CUSTOMIZATION INFORMATION | SEAL PROCESS ICON, READING PROCESS ICON, CONVERSION PROCESS ICON |

FIG. 9

| APPLICATION-RELATED INFORMATION | DOCUMENT IDENTIFICATION INFORMATION | 0001-0000 |
|---|---|---|
| | OPERATION TIME | 00:15:00 |
| | HISTORY OF OPERATORS' USER IDS | APPLICANT → APPROVER |
| | CUSTOMIZATION INFORMATION | SEAL PROCESS ICON, CONVERSION PROCESS ICON |

FIG. 10

| APPLICATION-RELATED INFORMATION | DOCUMENT IDENTIFICATION INFORMATION | 0001-0001 |
|---|---|---|
| | OPERATION TIME | 00:40:00 |
| | HISTORY OF OPERATORS' USER IDS | APPLICANT → APPROVER → APPLICANT → APPROVER → APPLICANT → APPROVER |
| | CUSTOMIZATION INFORMATION | SEAL PROCESS ICON, CONVERSION PROCESS ICON |

FIG. 11

| DOCUMENT IDENTIFICATION INFORMATION | OPERATION TIME | NUMBER OF MISTAKES | NUMBER OF OPERATION STEPS |
|---|---|---|---|
| 0001-0001 | 00:40:00 | 2 | 2 |
| 0001-0002 | 00:25:00 | 1 | 3 |
| 0001-0003 | 00:30:00 | 0 | 4 |

FIG. 12

APPLICATION SCREEN — A2

APPLICATION-FORM SELECTION

TYPE OF APPLICATION | BUSINESS-TRIP REQUEST ▼ — E1

WEIGHTED ITEM:
- NONE
- OPERATION TIME
- ✓ NUMBER OF MISTAKES
- NUMBER OF OPERATION STEPS

— E2

F1 — OK    CANCEL

FIG. 17

| USER ID | DOCUMENT IDENTIFICATION INFORMATION (FIRST ID) |
|---|---|
| ID001 - ID020 | 0011 |
| ID021 - ID050 | 0012 |
| ID051 - ID080 | 0013 |

FIG. 18A

| APPLICATION-RELATED INFORMATION | DOCUMENT IDENTIFICATION INFORMATION | 0011-0003 |
| --- | --- | --- |
| | OPERATION TIME | ... |
| | HISTORY OF OPERATORS' USER IDS | ... |
| | CUSTOMIZATION INFORMATION | ... |

FIG. 18B

| APPLICATION-RELATED INFORMATION | DOCUMENT IDENTIFICATION INFORMATION | 0013-0003 |
| --- | --- | --- |
| | OPERATION TIME | ... |
| | HISTORY OF OPERATORS' USER IDS | ... |
| | CUSTOMIZATION INFORMATION | ... | ered to as "user terminals 20" when these user terminals do not need
INFORMATION PROCESSING APPARATUS AND INFORMATION PROCESSING METHOD

CROSS-REFERENCE TO RELATED APPLICATIONS

This application is based on and claims priority under 35 USC 119 from Japanese Patent Application No. 2016-135865 filed Jul. 8, 2016.

BACKGROUND

Technical Field

The present invention relates to an information processing apparatus and an information processing method.

SUMMARY

According to an aspect of the invention, there is provided an information processing apparatus including a specifying unit and an output unit. The specifying unit specifies, in a case where multiple pieces of first and second information have been accumulated, each piece of first information indicating a document and an order of processes of a certain operation performed on the document and a corresponding piece of second information indicating a result of the certain operation in terms of multiple items, either of the multiple items on the basis of an operation performed by a user. The output unit outputs a piece of first information corresponding to a piece of second information for which the result of the certain operation meets a condition in terms of the specified item among the multiple pieces of first and second information.

BRIEF DESCRIPTION OF THE DRAWINGS

Exemplary embodiments of the present invention will be described in detail based on the following figures, wherein:

FIG. 9 is a diagram illustrating an example of updated application-related information;

FIG. 10 is a diagram illustrating an example of accumulated application-related information;

FIG. 11 is a diagram illustrating an example of accumulated result information regarding operations;

FIG. 12 is a diagram illustrating an example of an application-form selection screen;

FIG. 17 is a diagram illustrating an example of a document table;

FIGS. 18A and 18B are diagrams illustrating examples of a change history of application-related information;

DETAILED DESCRIPTION

1. Exemplary Embodiment

Figure 1:
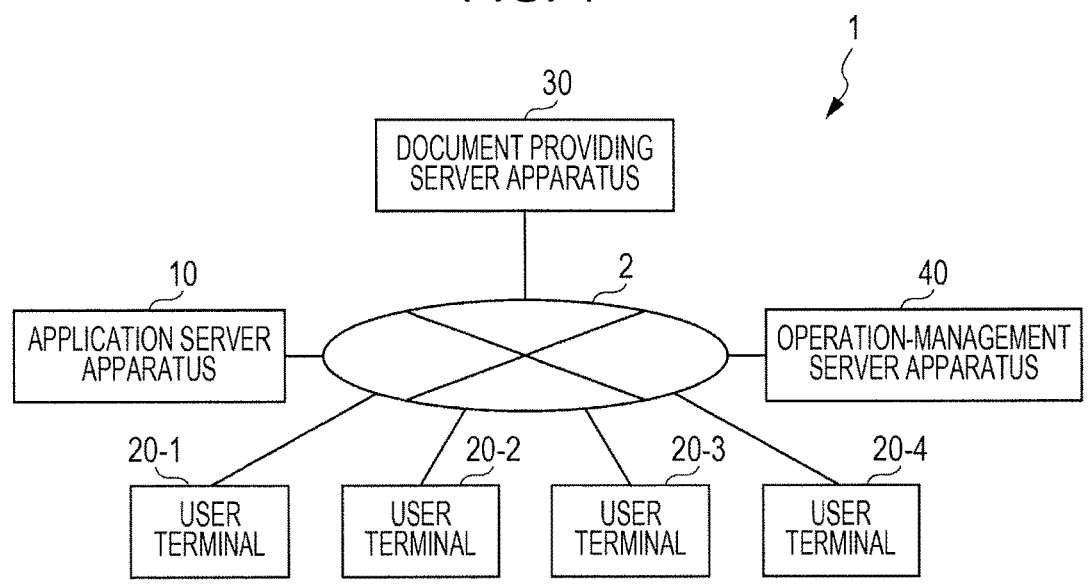
FIG. 1 is a diagram illustrating the overall configuration of an application operation system according to an exemplary embodiment.

FIG. 1 illustrates the overall configuration of an application operation system 1 according to an exemplary embodiment. The application operation system 1 performs processing related to application operations in, for example, a company. The application operation system 1 includes communication lines 2, an application server apparatus 10, user terminals 20-1, 20-2, 20-3, and 20-4 (hereinafter referred to as "user terminals 20" when these user terminals do not need to be distinguished from each other), a document providing server apparatus 30, and an operation-management server apparatus 40.

The communication lines 2 include, for example, a mobile communication network and the Internet, and transfer data between devices. The devices included in the application operation system 1 are connected to the communication lines 2 in a wired (or wireless) manner. The application server apparatus 10 is an information processing apparatus that executes processing related to the application operations. The user terminals 20 are terminal apparatuses operated by users using the application operation system 1.

The document providing server apparatus 30 is an information processing apparatus that performs processing for providing users with documents related to the application operations. The documents related to the application operations are, for example, an application document used to request a business trip and an application document used to request leave. The document providing server apparatus 30 performs processing for providing a document appropriate for a user in cooperation with the operation-management server apparatus 40 to be described later.

The operation-management server apparatus 40 is an information processing apparatus that manages operations to be performed on documents. The operations to be performed on documents are, for example, an operation for editing a document and an operation for transmitting a document. The operation-management server apparatus 40 accumulates information indicating a history of operations performed on documents and results of the operations in order to perform management. Details of information accumulated by the operation-management server apparatus 40 and a method for cooperating with the document providing server apparatus 30 will be described in detail later.

Figure 2:
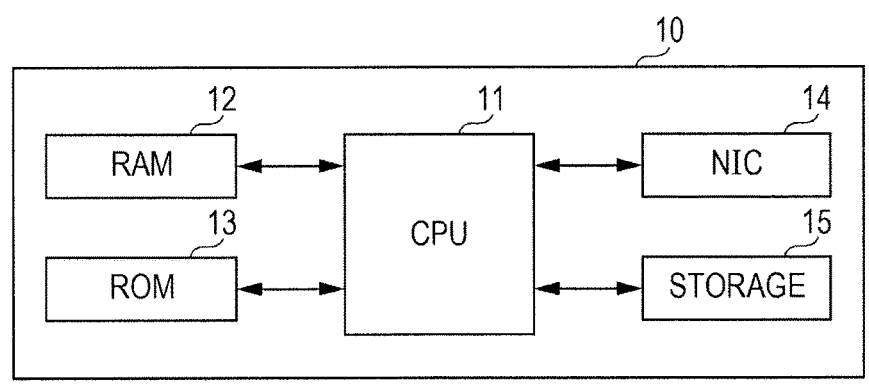
FIG. 2 is a diagram illustrating a hardware configuration of an application server apparatus.

FIG. 2 illustrates a hardware configuration of the application server apparatus 10. The application server apparatus 10 is a computer including a central processing unit (CPU)

11, a random-access memory (RAM) 12, a read-only memory (ROM) 13, a network interface card (NIC) 14, and a storage 15.

The CPU 11 controls operations of various units by executing, using the RAM 12 as a work area, programs stored in the ROM 13 and the storage 15. The NIC 14 includes a communication circuit that performs wireless communication based on mobile communications, and communicates with external devices via the communication lines 2. The storage 15 is a memory such as a hard disk drive (HDD), a solid-state drive (SSD), or a flash memory, and stores data and programs used by the CPU 11 to perform control.

Figure 3:
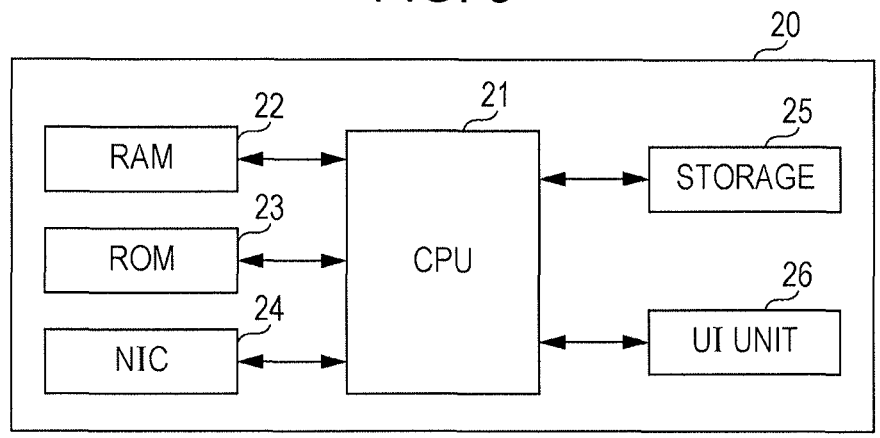
FIG. 3 is a diagram illustrating a hardware configuration of a user terminal.

FIG. 3 illustrates a hardware configuration of a user terminal 20 among the user terminals 20. The user terminal 20 is a computer including a CPU 21, a RAM 22, a ROM 23, a NIC 24, a storage 25, and a user interface (UI) unit 26. The CPU 21 to the storage 25 are hardware devices functionally the same as those having the same names and illustrated in FIG. 2. The UI unit 26 includes a liquid crystal display, and displays for example a menu screen for operating the user terminal 20. In addition, the UI unit 26 includes input devices such as a keyboard and a mouse.

Figure 4:
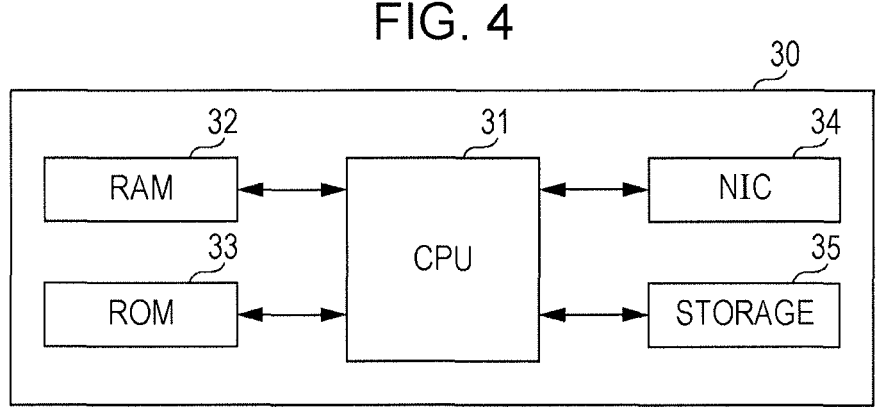
FIG. 4 is a diagram illustrating a hardware configuration of a document providing server apparatus.

FIG. 4 illustrates a hardware configuration of the document providing server apparatus 30. The document providing server apparatus 30 is a computer including a CPU 31, a RAM 32, a ROM 33, a NIC 34, and a storage 35. These hardware devices are functionally the same as those having the same names and illustrated in FIG. 2.

Figure 5:
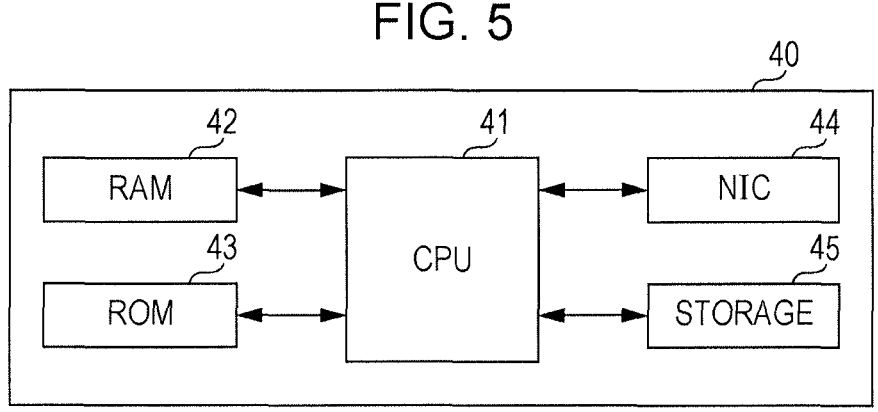
FIG. 5 is a diagram illustrating a hardware configuration of an operation-management server apparatus.

FIG. 5 illustrates a hardware configuration of the operation-management server apparatus 40. The operation-management server apparatus 40 is a computer including a CPU 41, a RAM 42, a ROM 43, a NIC 44, and a storage 45. These hardware devices are functionally the same as those having the same names and illustrated in FIG. 2.

The following functions are realized when the CPUs of the devices included in the application operation system 1 execute programs.

Figure 6:
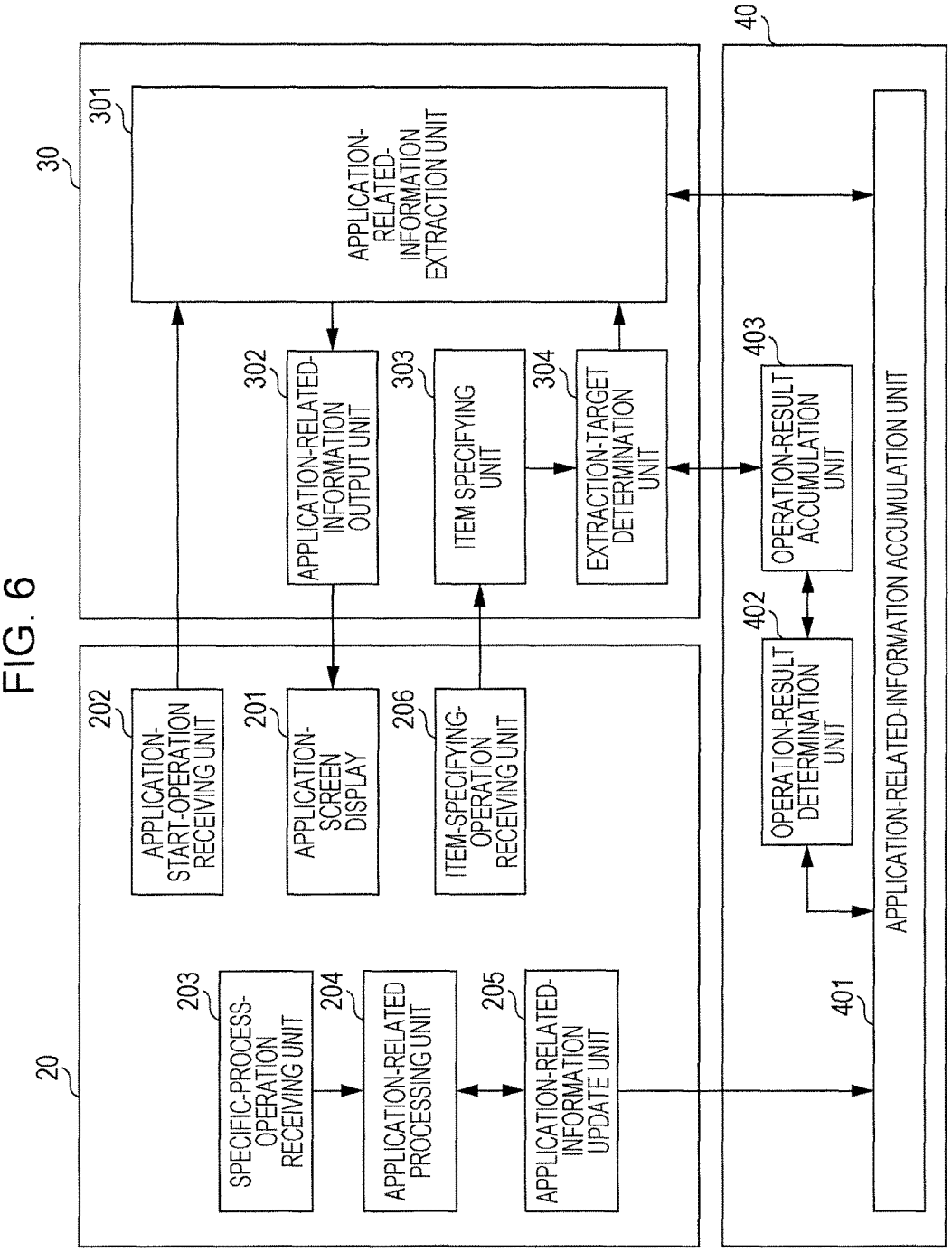
FIG. 6 is a diagram illustrating a functional configuration realized by the application operation system.

FIG. 6 illustrates a functional configuration realized by the application operation system 1. Each user terminal 20 includes an application-screen display 201, an application-start-operation receiving unit 202, a specific-process-operation receiving unit 203, an application-related processing unit 204, an application-related-information update unit 205, and an item-specifying-operation receiving unit 206. The document providing server apparatus 30 includes an application-related-information extraction unit 301, an application-related-information output unit 302, an item specifying unit 303, and an extraction-target determination unit 304. The operation-management server apparatus 40 includes an application-related-information accumulation unit 401, an operation-result determination unit 402, and an operation-result accumulation unit 403.

The application-screen display 201 of the user terminal 20 displays an application screen thorough which a user performs an application operation. On the application screen, the user selects the type of application that he or she is going to file, and performs an operation to start an operation for an application of the selected type. The application-start-operation receiving unit 202 receives this operation and notifies the document providing server apparatus 30 of the type of application for which the operation for starting the application operation has been received. The application-related-information extraction unit 301 of the document providing server apparatus 30 extracts application-related information collectively indicating information regarding the application operation the type of which has been received from the user terminals 20.

The application-related information includes document identification information used to identify a fixed-form document (application form) used for application, and furthermore information used to identify an applicant and an approver, and operations performed for application. That is, the application-related information indicates a document on which operations in an application operation are to be performed and a history of the operations. The application-related information is transferred to a user terminal 20 of the applicant and a user terminal 20 of the approver, and is updated as the application process proceeds. The document providing server apparatus 30 stores initial application-related information before such updates are performed.

Figures 7, 8:
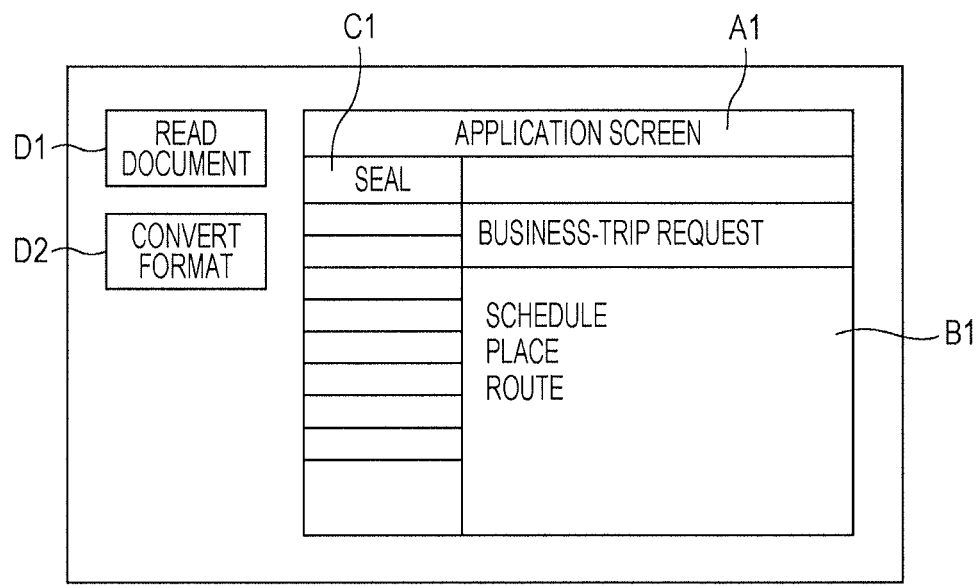
FIG. 7 is a diagram illustrating an example of initial application-related information.
FIG. 8 is a diagram illustrating an example of a displayed application screen.

FIG. 7 illustrates an example of the initial application-related information. In the example illustrated in FIG. 7, an example of the application-related information including items of "document identification information", "operation time", "history of operators' user IDs", and "customization information". In the present exemplary embodiment, information obtained by combining a first identification (ID) and a second ID is used as "document identification information". The first identification is represented by a four-digit number and is used to identify the type of application. The second ID is also represented by a four-digit number, and is used to identify a series of application procedure steps in which the application-related information is updated. The second ID is set to "0000" as an initial value.

For example, when a user A files an application using this application-related information, "0001" is allocated to the user A. Next, when a user B files an application using this application-related information, "0002" is allocated to the user B. In this manner, every time a user different from the previous users files an application using the document identification information, a new second ID is allocated. In the example illustrated in FIG. 7, document identification information of "0001-0000" is stored for identifying an application form for a business-trip request.

"Operation time" indicates the time that an applicant has spent to perform operations on a certain application screen to complete the application operation, namely to obtain approval of the application. This operation time also includes an additional operation time spent when the application is returned. The applicant has not started any operation yet in the example illustrated in FIG. 7, and thus an operation time of "00:00:00" is stored. The user IDs of the applicant and the approver are stored as "history of operators' user IDs". When the application is returned by the approver, the user ID of the applicant is stored after that of the approver, which indicates that the application has been returned. No one has started any operation yet in the example illustrated in FIG. 7, and thus no user ID is stored.

In the application operation system 1, an application operation is performed using images for operations associated with specific processes. In the following, "operation image" indicates such an image. For example, the image of an icon in a toolbar or the image of an icon displayed on the desktop is used as an operation image, and the operation image is designed to accept user customization. "Customization information" indicates a result of user customization regarding such operation images. In the example illustrated in FIG. 7, "seal process icon", "reading process icon", and "conversion process icon" are stored as initial operation images in the item "customization information". In this manner, the application-related information includes information indicating operation images.

A seal process icon is associated with a seal process in which a seal representing the name of a user is electrically added to a document. A reading process icon is associated with a reading process in which a scanner apparatus is caused to read a document. A conversion process icon is associated with a conversion process in which the format of document data is converted. For example, the name of the user using the user terminal 20 is set as a parameter in this seal process.

In addition, the reading process includes processing for starting an application program that receives image data from the scanner apparatus, processing for requesting image data from the scanner, and processing for saving the image data. In this manner, each operation image may be associated with multiple process operations and with parameters used in the process operations. The application-related information indicates image data of these operation images and image IDs used to identify the respective operation images, and also processes and parameters associated with the respective operation images. In this manner, the application-related information indicates at least the content of processes to be executed when an operation is performed on a document in an application operation and the order of these processes, and is an example of "first information" according to an exemplary embodiment of the present invention.

Upon being notified of the start of an operation for a business-trip request by the user terminal 20, the application-related-information extraction unit 301 extracts the application-related information illustrated in FIG. 7, and supplies the extracted application-related information to the application-related-information output unit 302. The application-related-information output unit 302 outputs the application-related information extracted by the application-related-information extraction unit 301 to the user terminal 20 that has transmitted the notification of the start of the application operation. The application-screen display 201 of the user terminal 20 displays, on the basis of the application-related information output from the document providing server apparatus 30, an application screen for the type of application operation selected by the user.

FIG. 8 illustrates an example of the displayed application screen. In the example illustrated in FIG. 8, the application-screen display 201 displays, on the basis of the application-related information illustrated in FIG. 7, an application screen A1 including an application form B1 for a business-trip request and a seal process icon C1. The application-screen display 201 acquires and displays an application form corresponding to the identification information included in application-related information. The application form may be stored in the user terminal 20 or may also be stored in the application server apparatus 10. The application-screen display 201 displays, on the basis of the application-related information, a reading process icon D1 and a conversion process icon D2 in addition to the application screen A1.

The specific-process-operation receiving unit 203 receives an operation performed on a displayed operation image as an operation for executing the specific process associated with the operation image. Upon receiving this operation, the specific-process-operation receiving unit 203 supplies, to the application-related processing unit 204, the image ID of the operation image for which the operation has been received.

The application-related processing unit 204 executes a process regarding the application operation. The application-related processing unit 204 executes, for example, a process associated with the image ID supplied from the specific-process-operation receiving unit 203 in the application-related information, namely the process associated with the operation image for which the operation has been received by the specific-process-operation receiving unit 203 (for example, the seal process, the reading process, or the conversion process described above). In addition, when the user performs an operation for a process that is not associated with any operation image, the application-related processing unit 204 executes the process. Examples of the process are a process for editing the application document and a process for attaching an attachment document to the application document. In addition, the application-related processing unit 204 executes, in accordance with operation performed by a user, a process for adding an operation image, a process for deleting an operation image, a process for changing a process or a parameter associated with an operation image.

The application-related processing unit 204 supplies, to the application-related-information update unit 205, an operation record (log) obtained when these processes are executed and the application-related information. The application-related-information update unit 205 updates the application-related information on the basis of the operation record supplied from the application-related processing unit 204.

FIG. 9 illustrates an example of the updated application-related information. In the example illustrated in FIG. 9, the operation time is updated to "00:15:00", and the history of operators' user IDs is updated to "applicant→approver". These updates indicate that the applicant has transmitted, to the approver, an application form completed by performing operation for 15 minutes. In addition, the customization information is updated to "seal process icon, conversion process icon". This update indicates that the applicant has determined that the reading process icon is unnecessary and has deleted the icon.

The application-related-information update unit 205 supplies the updated application-related information to the application-related processing unit 204 when the application operation is not completed. When the user of the user terminal 20 is the applicant or when the user of the user terminal 20 is the approver and returns the application operation, the application-related-information update unit 205 transmits the supplied application-related information to the application server apparatus 10, and executes a process for requesting transfer of the application-related information to the user terminal 20 of the other user. In this case, the other user is the approver when the user is the applicant, and the other user is the applicant when the user is the approver. When the user of the user terminal 20 is the approver and the application operation is completed (when the approver gives approval), the application-related-information update unit 205 transmits the updated application-related information to the operation-management server apparatus 40.

The application-related-information accumulation unit 401 of the operation-management server apparatus 40 accumulates the application-related information transmitted from the user terminal 20. In this case, in the case where pieces of application-related information having the same first ID as that of the application-related information transmitted from the user terminal 20 have already been accumulated, the application-related-information accumulation unit 401 allocates, to the application-related information transmitted from the user terminal 20, a second ID different from those of the pieces of application-related information and from the initial value "0000", and accumulates the application-related information.

FIG. 10 illustrates an example of the accumulated application-related information. In the example illustrated in FIG. 10, the application-related-information accumulation unit 401 accumulates, for the first time, application-related information having a first ID of "0001", and thus allocates a second ID of "0001" to the application-related information and accumulates the application-related information. This example illustrates that the operation time is 40 minutes in the end and the application has been returned twice.

The operation-result determination unit 402 of the operation-management server apparatus 40 determines, in terms of multiple items, a result of the application operation on the basis of the operation history indicated by the application-related information accumulated in the application-related-information accumulation unit 401. The operation-result determination unit 402 determines a result of the application operation in terms of three items: the operation time, the number of mistakes, and the number of operation steps (the number of operations in the application operation) in the present exemplary embodiment. When application-related information is accumulated in the application-related-information accumulation unit 401, the operation-result determination unit 402 reads out the application-related information, and determines the operation time indicated by the application-related information to be a result of the application operation. For example, in the example illustrated in FIG. 10, the operation-result determination unit 402 simply determines that the operation time, 40 minutes, is a result of the application operation.

In addition, the operation-result determination unit 402 determines the number of mistakes in the application to be a result of the application operation on the basis of the history of operators' user IDs, the history being indicated by the application-related information. For example, since the example illustrated in FIG. 10 illustrates that the approver has returned the application twice, the operation-result determination unit 402 determines the number of mistakes to be two. In addition, the operation-result determination unit 402 determines the number of operation steps to be a result of the application operation on the basis of the customization information indicated by the application-related information. For example, since the example illustrated in FIG. 10 illustrates that two operation images of "seal process icon" and "conversion process icon", the operation-result determination unit 402 determines the number of operation steps to be two.

The operation-result determination unit 402 supplies, to the operation-result accumulation unit 403, the results determined in this manner and the document identification information indicated by the application-related information used in the determination. The operation-result accumulation unit 403 accumulates result information indicating the results of the application operation in terms of the multiple items, the results having been determined by the operation-result determination unit 402. The multiple items are three items in the present exemplary embodiment: the time needed for the application operation, the number of mistakes during the application operation, and the number of operations (the number of operation steps) during the application operation. This result information is an example of "second information" according to an exemplary embodiment of the present invention.

FIG. 11 illustrates an example of the accumulated result information regarding application operations. In the example illustrated in FIG. 11, an operation time of "00:40:00", a number of mistakes of "2", and a number of operation steps "2" are accumulated in association with document identification information of "0001-0001". In addition, an operation time of "00:25:00", a number of mistakes of "1", and a number of operation steps of "3" are accumulated in association with document identification information of "0001-0002". An operation time of "00:30:00", a number of mistakes of "0", and a number of operation steps of "4" are accumulated in association with document identification information of "0001-0003".

The item-specifying-operation receiving unit 206 of the user terminal 20 receives an operation for specifying either of the multiple items indicated by the result information regarding the application operations. This operation is received through, for example, an application-form selection screen.

FIG. 12 illustrates an example of the application-form selection screen. In the example illustrated in FIG. 12, the application-screen display 201 displays an application screen A2 for selecting an application form.

The application screen A2 illustrates a selection field E1 for selecting the type of application, and a selection field E2 for selecting an item weighted by the user from among "none", "operation time", "number of mistakes", and "number of operation steps" (the multiple items indicated by the result information regarding the application operations). In this example "business-trip request" has been selected in the selection field E1 and "number of mistakes" has been selected in the selection field E2. When the user presses an OK button in a state in which the type of application and an item weighted by the user are selected by operating the selection fields E1 and E2, the item-specifying-operation receiving unit 206 receives these operations as the item specifying operation. Upon receiving this operation, the item-specifying-operation receiving unit 206 notifies the document providing server apparatus 30 of the specified type of application and the specified item.

The item specifying unit 303 of the document providing server apparatus 30 specifies, in accordance with the operation performed by the user, either of the multiple items indicated by the result information regarding the application operations. The item specifying unit 303 is an example of a "specifying unit" according to an exemplary embodiment of the present invention. The item specifying unit 303 specifies, as either of the multiple items, the item indicated by the received notification, and notifies the extraction-target determination unit 304 of the specified item.

The extraction-target determination unit 304 determines, on the basis of the item specified by the item specifying unit 303, application-related information to be extracted by the application-related-information extraction unit 301. The extraction-target determination unit 304 determines an extraction target in the following manner. First, the extraction-target determination unit 304 requests, from the operation-management server apparatus 40, the result information accumulated in the operation-result accumulation unit 403. Upon receiving this request, the operation-result accumulation unit 403 transmits multiple pieces of accumulated result information to the document providing server apparatus 30.

Upon acquiring the multiple pieces of transmitted result information, the extraction-target determination unit 304 determines result information regarding the specified item and meeting conditions among the multiple pieces of result information. When the specified item is "operation time", the extraction-target determination unit 304 determines, as result information meeting conditions, a predetermined number of pieces of result information selected in ascending order of operation time among the operation times indicated by the multiple pieces of accumulated result information, the predetermined number of pieces of result information being included in the multiple pieces of result information. The extraction-target determination unit 304 determines the result information indicating the shortest operation time in the present exemplary embodiment. In the example illustrated in FIG. 11, the extraction-target determination unit 304 determines the result information indicating the shortest operation time, which is 25 minutes, namely the result information associated with the document identification information of "0001-0002".

In addition, when the specified item is "number of mistakes", the extraction-target determination unit 304 determines, as result information meeting conditions, a predetermined number of pieces of result information selected in ascending order of number of mistakes among the numbers of mistakes indicated by the multiple pieces of accumulated result information, the predetermined number of pieces of result information being included in the multiple pieces of result information. The extraction-target determination unit 304 determines the result information indicating the smallest number of mistakes in the present exemplary embodiment. In the example illustrated in FIG. 11, the extraction-target determination unit 304 determines the result information indicating the smallest number of mistakes, which is 0, namely the result information associated with the document identification information of "0001-0003".

In addition, when the specified item is "number of operation steps", the extraction-target determination unit 304 determines, as result information meeting conditions, a predetermined number of pieces of result information selected in ascending order of number of operation steps among the numbers of operation steps indicated by the multiple pieces of accumulated result information, the predetermined number of pieces of result information being included in the multiple pieces of result information. The extraction-target determination unit 304 determines the result information indicating the smallest number of operation steps in the present exemplary embodiment. In the example illustrated in FIG. 11, the extraction-target determination unit 304 determines the result information indicating the smallest number of operation steps, which is 2, namely the result information associated with the document identification information of "0001-0001".

The extraction-target determination unit 304 determines, as an extraction target, application-related information associated with the document identification information included in the result information determined in this manner. The extraction-target determination unit 304 supplies the document identification information included in the determined application-related information to the application-related-information extraction unit 301. The application-related-information extraction unit 301 requests, from the operation-management server apparatus 40, application-related information associated with the supplied document identification information. Upon receiving this request, the application-related-information accumulation unit 401 of the operation-management server apparatus 40 reads out the requested application-related information and transmits the read-out application-related information to the document providing server apparatus 30.

The application-related-information extraction unit 301 extracts in this manner, from the application-related information accumulated in the application-related-information accumulation unit 401, the application-related information that the extraction-target determination unit 304 has determined to be an extraction target. The application-related-information output unit 302 outputs the application-related information extracted in this manner, that is, the application-related information corresponding to the result information regarding an operation the result of which meets conditions in terms of the item specified by the user. The application-screen display 201 displays, on the basis of the output application-related information, an application screen for an application operation for the type of application selected by the user.

Figure 13:
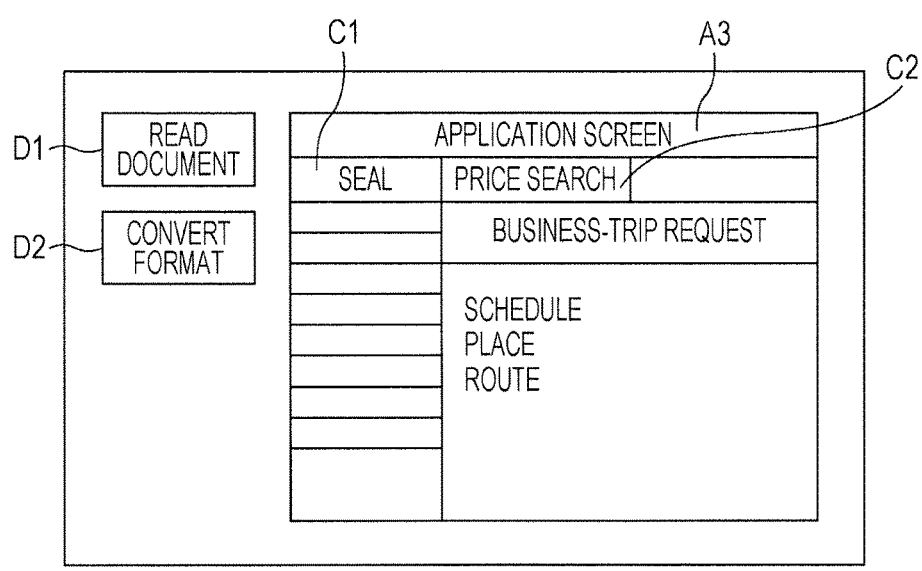
FIG. 13 is a diagram illustrating an example of a displayed application screen.

FIG. 13 illustrates an example of the displayed application screen. In the example illustrated in FIG. 13, the application-screen display 201 displays the application screen on the basis of the application-related information output after the item "number of mistakes" has been specified in the operation described with reference to FIG. 12. The result information indicating the smallest number of mistakes of 0 in the example illustrated in FIG. 11 indicates a number of operation steps of 4. This means that the corresponding application-related information indicates four operation images as customization information.

The application-screen display 201 displays, as the four operation images, the seal process icon C1, a price-search process icon C2, the reading process icon D1, and the conversion process icon D2 included in an application screen A3. The price-search process icon C2 is an operation image for receiving an operation for executing a search process in which a search for the transportation cost needed to, for example, move from one station to another is conducted, the names of the stations having been input as a route.

With the configuration described above, the user terminal 20, the document providing server apparatus 30, and the operation-management server apparatus 40 perform an accumulation process for accumulating application-related information and result information regarding an operation and a display process for displaying an application screen on the basis of the accumulated application-related information.

Figure 14:
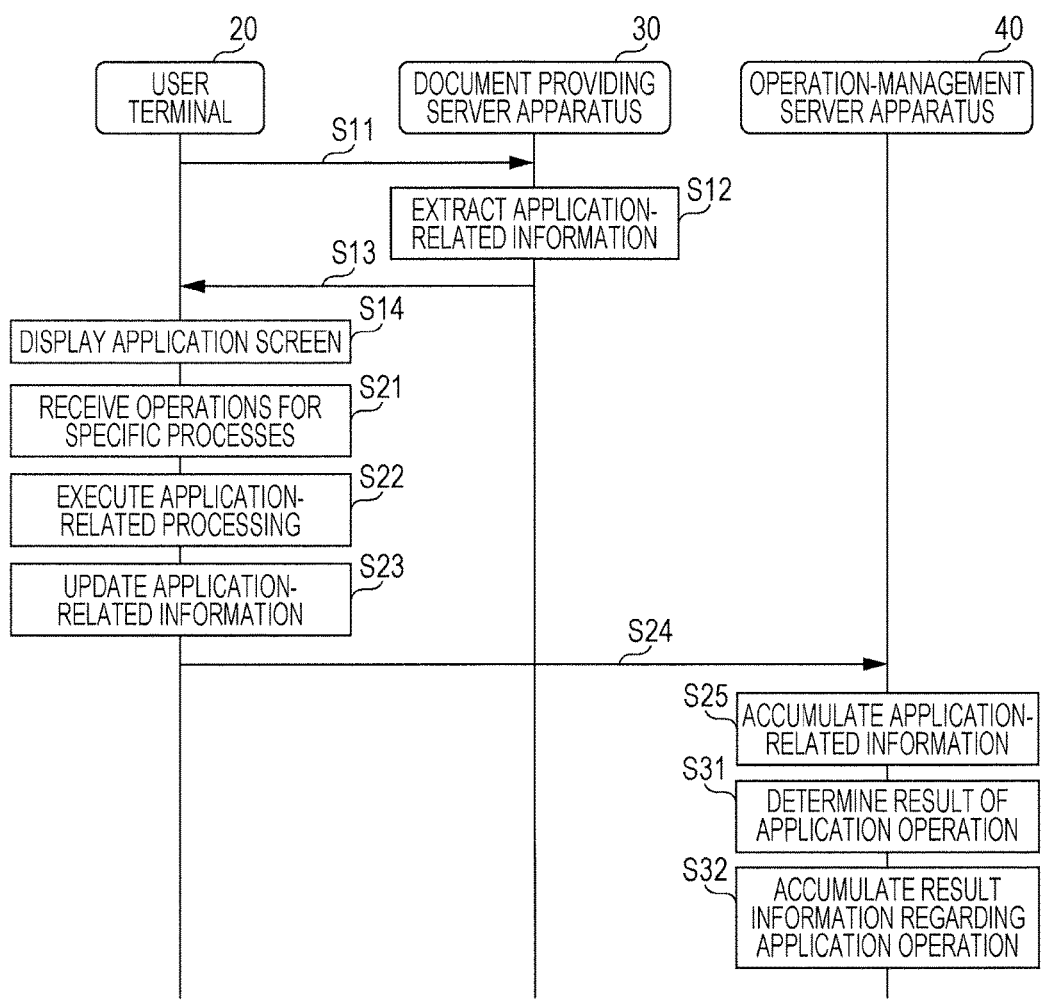
FIG. 14 is a diagram illustrating an example of an operation procedure of apparatuses in an accumulation process.

FIG. 14 illustrates an example of an operation procedure of the user terminal 20, the document providing server apparatus 30, and the operation-management server apparatus 40 in the accumulation process. This operation procedure is started, for example, when an operation for starting an operation for the type of application selected by a user is performed. First, the user terminal 20 (the application-start-operation receiving unit 202) notifies the document providing server apparatus 30 of the type of application for which the operation for starting the operation has been received (step S11).

The document providing server apparatus 30 (the application-related-information extraction unit 301) extracts application-related information related to the type of application of which the document providing server apparatus 30 has been notified (step S12). The document providing server apparatus 30 (the application-related-information output unit 302) outputs the extracted application-related information to the user terminal 20 (step S13). The user terminal 20 (the application-screen display 201) displays an application screen on the basis of the output application-related information (step S14). The user terminal 20 (the specific-process-operation receiving unit 203) receives operations for specific processes, the operations being performed on the operation images such as the seal process icon C1 and the reading process icon D1 illustrated in FIG. 8 (step S21).

The user terminal 20 (the application-related processing unit 204) executes, on the basis of the received operations, application-related processing including the specific processes (step S22). The user terminal 20 (the application-related-information update unit 205) updates, on the basis of an operation record based on the executed application-related processing, the application-related information received in step S13 (step S23). When the application operation is completed, the user terminal 20 (the application-related-information update unit 205) transmits the updated application-related information to the operation-management server apparatus 40 (step S24).

The operation-management server apparatus 40 (the application-related-information accumulation unit 401) accumulates the application-related information received in step S24 (step S25). The operation-management server apparatus 40 (the operation-result determination unit 402) determines, on the basis of the history of operations indicated by the accumulated application-related information, a result of the application operation in terms of multiple items (step S31). The operation-management server apparatus 40 (the operation-result accumulation unit 403) accumulates result information indicating the result of the application operation determined in step S31 in terms of the multiple items (step S32).

Figure 15:
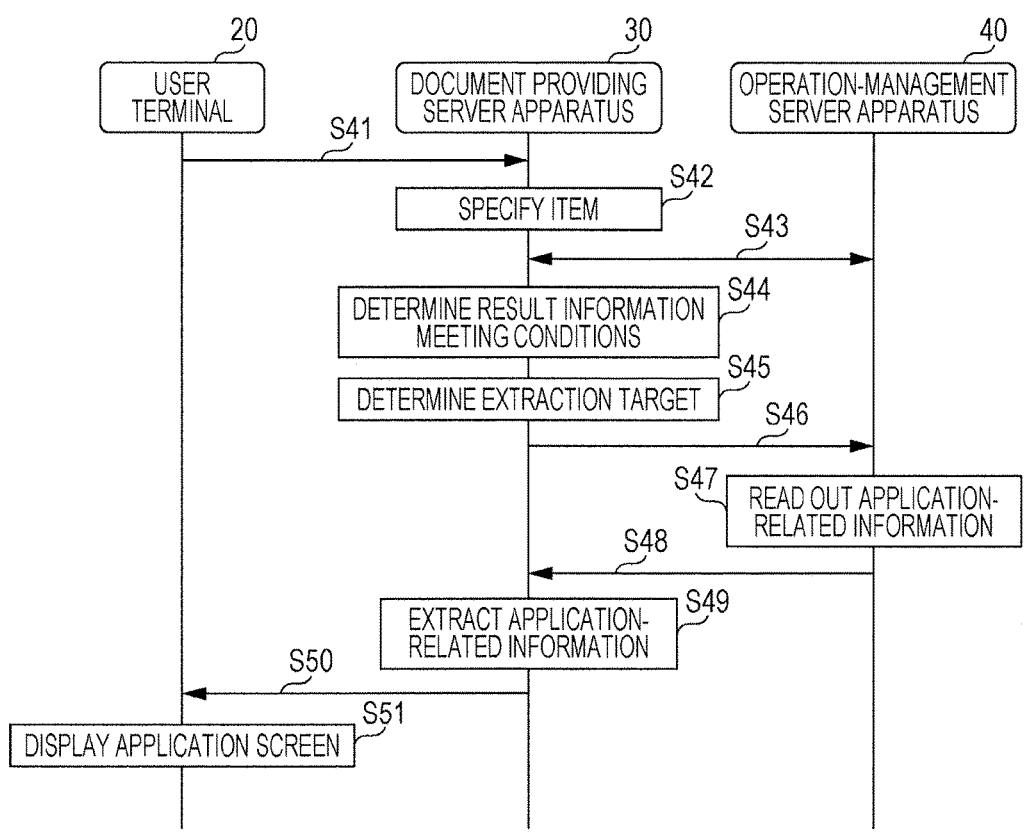
FIG. 15 is a diagram illustrating an example of an operation procedure of the apparatuses in a display process.

FIG. 15 illustrates an example of an operation procedure of the user terminal 20, the document providing server apparatus 30, and the operation-management server apparatus 40 in the display process. This operation procedure is started, for example, when an operation for selecting the type of application on the application screen illustrated in FIG. 12 and for specifying an item weighted by the user is performed by the user. First, the user terminal 20 (the item-specifying-operation receiving unit 206) notifies the document providing server apparatus 30 of the type of application and the item specified through the received operation (step S41). The document providing server apparatus 30 (the item specifying unit 303) specifies the item indicated by the notification received in step S41 as either of the multiple items indicated by operation information (step S42).

The document providing server apparatus 30 (the extraction-target determination unit 304) acquires accumulated result information regarding operations from the operation-management server apparatus 40 (step S43). The document providing server apparatus 30 (the extraction-target determination unit 304) determines result information regarding the specified item and meeting conditions in the acquired result information regarding operations (step S44). The document providing server apparatus 30 (the extraction-target determination unit 304) determines, to be an extraction target, application-related information corresponding to the determined result information (step S45). The document providing server apparatus 30 (the application-related-information extraction unit 301) requests the determined application-related information from the operation-management server apparatus 40 (step S46).

The operation-management server apparatus 40 (the application-related-information accumulation unit 401) reads out the application-related information requested in step S46 (step S47), and transmits the read-out application-related information to the document providing server apparatus 30 (step S48). The document providing server apparatus 30 (the application-related-information extraction unit 301) completes extraction of the application-related information that is the extraction target by receiving the transmitted application-related information (step S49). The document providing server apparatus 30 (the application-related-information output unit 302) outputs the extracted application-related information to the user terminal 20 (step S50). The user terminal 20 (the application-screen display 201) displays an application screen on the basis of the output application-related information (step S51).

The customization information included in the application-related information described above indicates operation images used by the user to perform operations, namely the content and order of processes executed through the operations performed by the user. In addition, the document identification information included in the application-related information indicates the type of document for which the user has performed operations.

2. Modifications

The exemplary embodiment described above is mere an exemplary embodiment of the present invention, and may also be modified as in the following. In addition, some or all of the exemplary embodiment and modifications may also be combined and executed as necessary.

2-1. Document per User

The operations for the above-described document may be performed on a document corresponding to a user. For example, a document form for meeting-room reservation application may differ depending on, for example, the business establishment for which or the floor on which the user works, or the department to which the user belongs. In this case, the application-related information used when an application screen for a certain user is displayed may be changed to indicate a document corresponding to the user.

Figure 16:
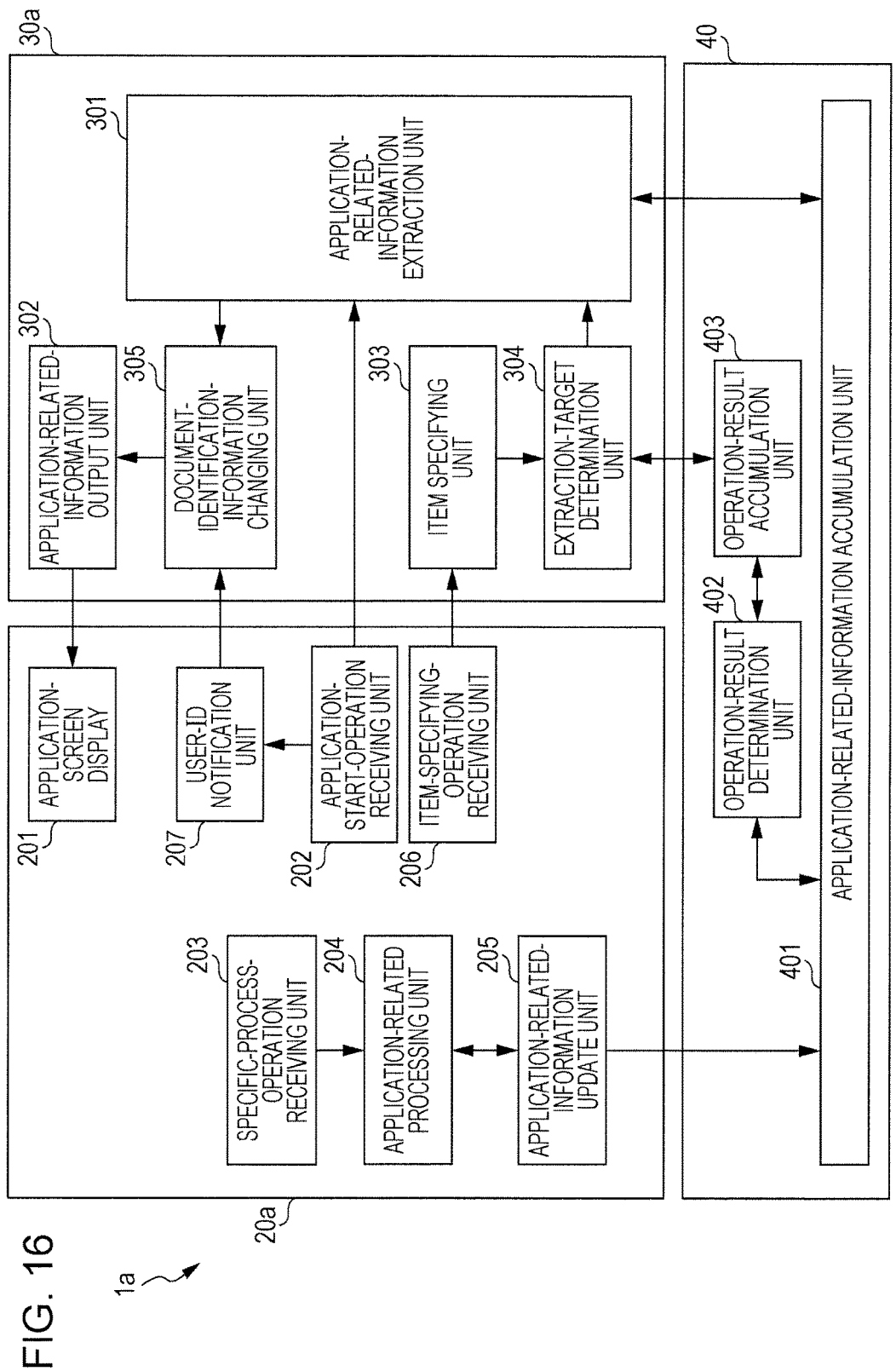
FIG. 16 is a diagram illustrating a functional configuration realized by an application operation system according to a modification.

FIG. 16 illustrates a functional configuration realized by an application operation system 1a according to the present modification. The application operation system 1a includes a user terminal 20a, a document providing server apparatus 30a, and the operation-management server apparatus 40. The user terminal 20a includes a user-ID notification unit 207 in addition to the units illustrated in FIG. 6. The document providing server apparatus 30a includes a document-identification-information changing unit 305 in addition to the units illustrated in FIG. 6.

Upon receiving an operation for starting an application operation, the application-start-operation receiving unit 202 of the user terminal 20a notifies the user-ID notification unit 207 of the reception in the present modification. Upon receiving the notification, the user-ID notification unit 207 transmits a user ID of the user using the user terminal 20a to the document providing server apparatus 30a. The document-identification-information changing unit 305 of the document providing server apparatus 30a receives the transmitted user ID. The application-related information extracted from the application-related-information extraction unit 301 is supplied to the document-identification-information changing unit 305.

The document-identification-information changing unit 305 changes first document identification information indicated by the application-related information extracted by the application-related-information extraction unit 301 into second document identification information indicating a document corresponding to the user to whom the user ID received from the user terminal 20a has been allocated. The document-identification-information changing unit 305 is an example of a "changing unit" according to an exemplary embodiment of the present invention. The first document identification information indicates a document corresponding to a user who has performed operations the history (the content of processes executed through the operations performed on the document and the procedure of the processes) of which is indicated by the extracted application-related information. The second document identification information indicates a document corresponding to a user who has performed an operation for specifying an item. The document-identification-information changing unit 305 performs such changing by using a document table in which user IDs are associated with types of document.

FIG. 17 illustrates an example of the document table. In the example illustrated in FIG. 17, "0011" that is a first ID of document identification information is associated with a user ID of "ID001 to ID020". In addition, "0012" that is a first ID of document identification information is associated with a user ID of "ID021 to ID050", and "0013" that is a first ID of document identification information is associated with a user ID of "ID051 to ID080". The document-identification-information changing unit 305 reads out the first ID associated with the user ID transmitted from the user terminal 20a in the document table.

When the application-related information is supplied from the application-related-information extraction unit 301, in the case where the first ID of the document identification information indicated by the application-related information matches the read-out first ID, the document-identification-information changing unit 305 supplies the application-related information as is to the application-related-information output unit 302. In the case where the first ID of the document identification information indicated by the application-related information does not match the read-out first ID, the document-identification-information changing unit 305 changes the first ID of the document identification information indicated by the application-related information to the read-out first ID, and supplies the resulting application-related information to the application-related-information output unit 302.

FIGS. 18A and 18B illustrate examples of a change history of the application-related information. FIG. 18A illustrates an example of the application-related information supplied from the application-related-information extraction unit 301, and the document identification information is set to "0011-0003". In the case of receiving a user ID of, for example, "ID060" from the user terminal 20a, the document-identification-information changing unit 305 changes the first ID of the document identification information to a first ID of "0013" associated with the user ID in the document table, and supplies the application-related information as illustrated in FIG. 18B to the application-related-information output unit 302.

The application-screen display 201 of the user terminal 20a acquires and displays the application form corresponding to the document identification information indicated by the application-related information output in this manner. In the case where the document identification information is not changed, the application-screen display 201 displays the application form corresponding to a first ID of "0011". In this case, the user needs to perform an operation to change the application form to that corresponding to the user.

2-2. Apparatuses Realizing Functions

The apparatuses realizing the functions illustrated in FIG. 6 and the like may differ from the ones above.

Figure 19:
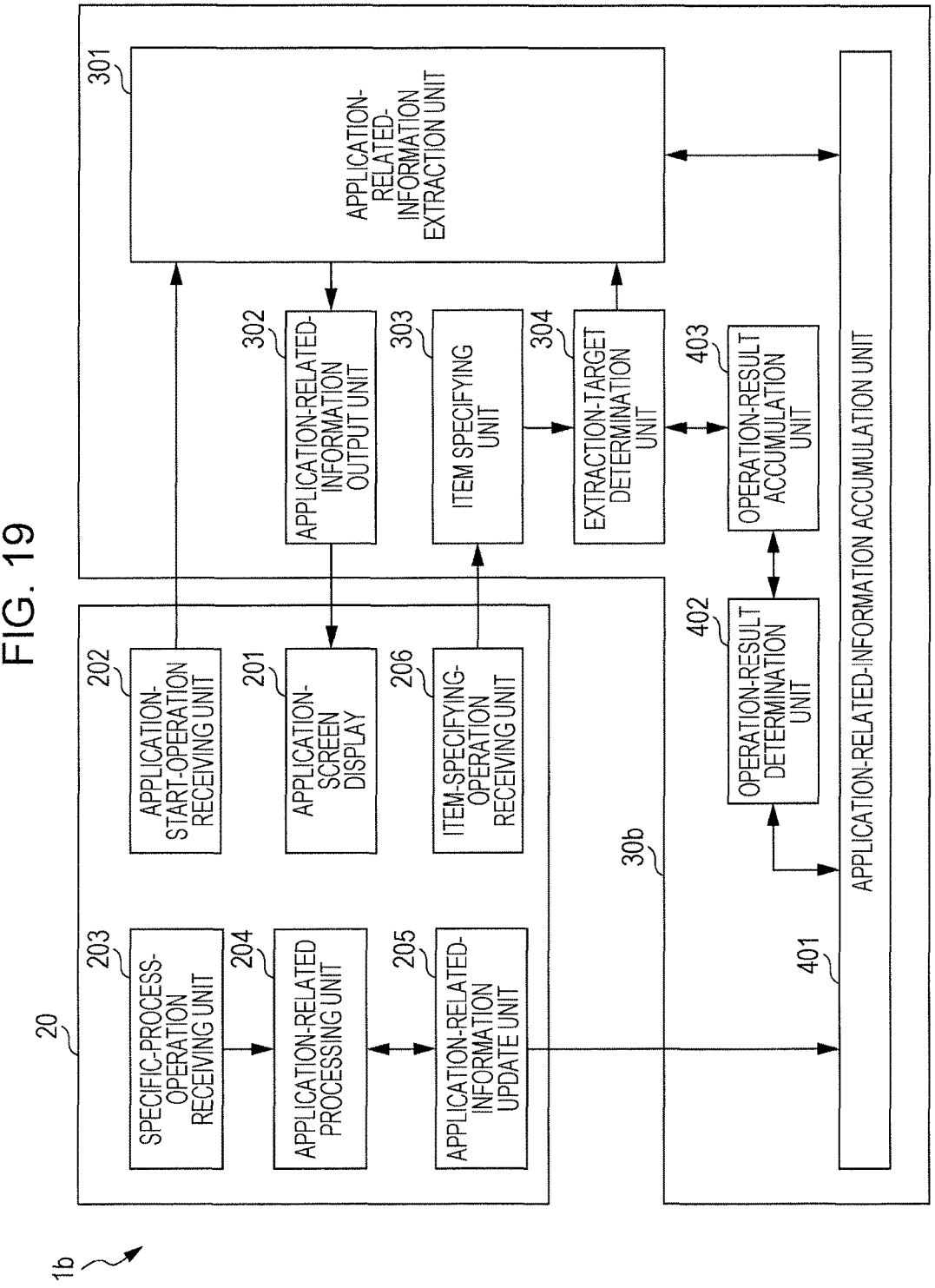
FIG. 19 is a diagram illustrating a functional configuration realized by an application operation system according to a modification.

FIG. 19 illustrates a functional configuration realized by an application operation system 1b according to the present modification. The application operation system 1b includes the user terminal 20 and a document providing server apparatus 30b. The document providing server apparatus 30b has the functions of the operation-management server apparatus 40 (the application-related-information accumulation unit 401, the operation-result determination unit 402, and the operation-result accumulation unit 403) in addition to the units illustrated in FIG. 6. In this manner, one apparatus may also accumulate application-related information and result information, and also extract and output the application-related information. The document providing server apparatus 30b is an example of an "information processing apparatus" according to an exemplary embodiment of the present invention in this case.

Figure 20:
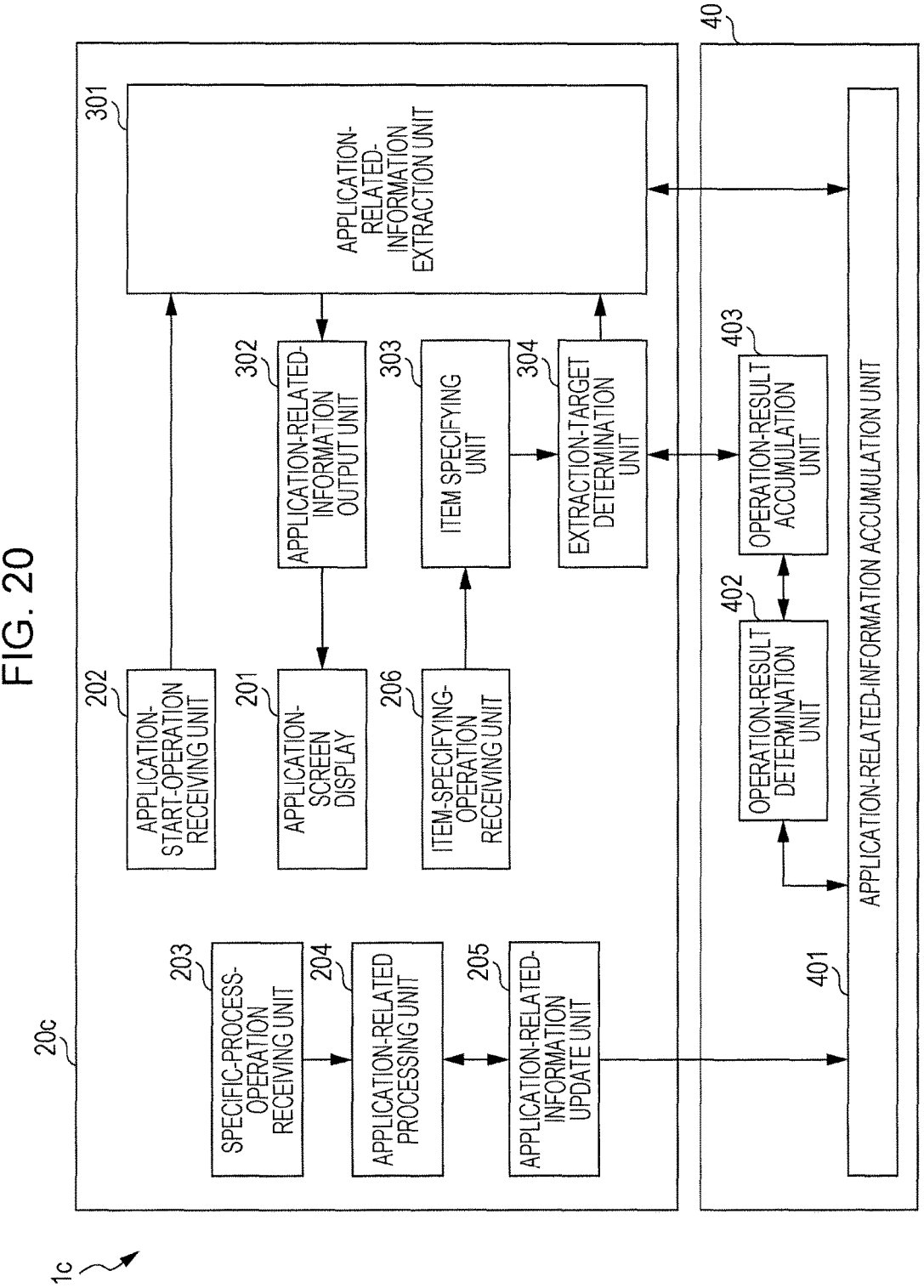
FIG. 20 is a diagram illustrating a functional configuration realized by an application operation system according to the modification.

FIG. 20 illustrates a functional configuration realized by an application operation system 1c according to the present modification. The application operation system 1c includes a user terminal 20c and the operation-management server apparatus 40. The user terminal 20c has the functions of the document providing server apparatus 30 (the application-related-information extraction unit 301, the application-related-information output unit 302, the item specifying unit 303, and the extraction-target determination unit 304) in addition to the units illustrated in FIG. 6. In this manner, the user terminal 20c may also extract and output application-related information. The user terminal 20c is an example of an "information processing apparatus" according to an exemplary embodiment of the present invention in this case.

2-3. Applicability of Embodiment

The exemplary embodiment is applied to the application operation system; however, the exemplary embodiment may also be applied to something else. The exemplary embodiment may also be applied to various systems in which operations are performed on documents, example of the various systems being a financial system, a personnel management system, a sales management system, a production management system, and a purchasing system. For example, in the case of the financial system, operations are performed on a document, and first information indicating the history of the operations (including the content of processes executed through the operations, and the procedure of the processes) and the document, and second information indicating a result of the operations in terms of multiple items are accumulated, examples of the document being a journal slip, a breakdown list, and a financial report. In this case, too, the first information corresponding to the second information for which the result of the operations meets conditions in terms of the item specified on the basis of an operation performed by the user is output. As a result, the information indicating a specific method among the operation methods performed in the past is designed to be output as in the exemplary embodiment.

2-4. Category of Embodiments

In addition to information processing apparatuses that are the document providing server apparatus 30 and the operation-management server apparatus 40, an information processing system including the information processing apparatuses and user terminals may be construed as an exemplary embodiment of the present invention. Moreover, exemplary embodiments of the present invention may also include a non-transitory computer readable medium storing a program for causing a computer that controls various apparatuses to function. This program may be provided in the form of a recording medium such as an optical disc in which the program is stored, or may also be provided by being downloaded via communication lines such as the Internet and installed into a computer so as to be usable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor programmed to:
   when a plurality of pieces of first and second information have been accumulated, each piece of first information indicating (i) a document, (ii) an order of processes of a certain operation performed on the document, and a corresponding piece of second information indicating a result of the certain operation in terms of a plurality of items, specify one of the plurality of items on the basis of an operation performed by a user; and
   output a piece of first information corresponding to a piece of second information for which the result of the certain operation meets a condition in terms of the specified item among the plurality of pieces of first and second information.

2. The information processing apparatus according to claim 1, wherein:
   each piece of second information indicates, as the result of the certain operation, a time needed for the certain operation, and
   a predetermined number of pieces of second information selected in ascending order of time meet the condition among the plurality of pieces of accumulated second information.

3. The information processing apparatus according to claim 1, wherein:
   each piece of second information indicates, as the result of the certain operation, the number of mistakes that have occurred in the certain operation, and
   a predetermined number of pieces of second information selected in ascending order of number of mistakes meet the condition among the plurality of pieces of accumulated second information.

4. The information processing apparatus according to claim 2, wherein:
   each piece of second information indicates, as the result of the certain operation, the number of mistakes that have occurred in the certain operation, and
   a predetermined number of pieces of second information selected in ascending order of number of mistakes meet the condition among the plurality of pieces of accumulated second information.

5. The information processing apparatus according to claim 1, wherein:
   each piece of second information indicates, as the result of the certain operation, the number of operations in the certain operation, and
   a predetermined number of pieces of second information selected in ascending order of number of operations meet the condition among the plurality of pieces of accumulated second information.

6. The information processing apparatus according to claim 2, wherein:
   each piece of second information indicates, as the result of the certain operation, the number of operations in the certain operation, and
   a predetermined number of pieces of second information selected in ascending order of number of operations meet the condition among the plurality of pieces of accumulated second information.

7. The information processing apparatus according to claim 3, wherein:
   each piece of second information indicates, as the result of the certain operation, the number of operations in the certain operation, and
   a predetermined number of pieces of second information selected in ascending order of number of operations meet the condition among the plurality of pieces of accumulated second information.

8. The information processing apparatus according to claim 4, wherein:
   each piece of second information indicates, as the result of the certain operation, the number of operations in the certain operation, and
   a predetermined number of pieces of second information selected in ascending order of number of operations meet the condition among the plurality of pieces of accumulated second information.

9. The information processing apparatus according to claim 1, wherein:
   the certain operation is performed using an operation image associated with a specific process, and
   a piece of first information among the plurality of pieces of first information includes information indicating the operation image.

10. The information processing apparatus according to claim 2, wherein:
    the certain operation is performed using an operation image associated with a specific process, and
    a piece of first information among the plurality of pieces of first information includes information indicating the operation image.

11. The information processing apparatus according to claim 3, wherein:
    the certain operation is performed using an operation image associated with a specific process, and
    a piece of first information among the plurality of pieces of first information includes information indicating the operation image.

12. The information processing apparatus according to claim 4, wherein:
    the certain operation is performed using an operation image associated with a specific process, and
    a piece of first information among the plurality of pieces of first information includes information indicating the operation image.

13. The information processing apparatus according to claim 5, wherein:
    the certain operation is performed using an operation image associated with a specific process, and
    a piece of first information among the plurality of pieces of first information includes information indicating the operation image.

14. The information processing apparatus according to claim 6, wherein:
    the certain operation is performed using an operation image associated with a specific process, and
    a piece of first information among the plurality of pieces of first information includes information indicating the operation image.

15. The information processing apparatus according to claim 1, wherein:
    the certain operation is performed on a document corresponding to the user, and
    the processor is further programmed to change, in the outputted piece of first information, information indicating the document corresponding to the user who has performed the certain operation corresponding to the order of processes indicated by the piece of first information to information indicating a document corresponding to the user who has performed the operation for specifying the item.

16. The information processing apparatus according to claim 2, wherein:
   the certain operation is performed on a document corresponding to the user, and
   the processor is further programmed to change, in the outputted piece of first information, information indicating the document corresponding to the user who has performed the certain operation corresponding to the order of processes indicated by the piece of first information to information indicating a document corresponding to the user who has performed the operation for specifying the item.

17. The information processing apparatus according to claim 3, wherein:
   the certain operation is performed on a document corresponding to the user, and
   the processor is further programmed to change, in the outputted piece of first information, information indicating the document corresponding to the user who has performed the certain operation corresponding to the order of processes indicated by the piece of first information to information indicating a document corresponding to the user who has performed the operation for specifying the item.

18. The information processing apparatus according to claim 5, wherein:
   the certain operation is performed on a document corresponding to the user, and
   the processor is further programmed to change, in the outputted piece of first information, information indicating the document corresponding to the user who has performed the certain operation corresponding to the order of processes indicated by the piece of first information to information indicating a document corresponding to the user who has performed the operation for specifying the item.

19. The information processing apparatus according to claim 9, wherein:
   the certain operation is performed on a document corresponding to the user, and
   the processor is further programmed to change, in the outputted piece of first information, information indicating the document corresponding to the user who has performed the certain operation corresponding to the order of processes indicated by the piece of first information to information indicating a document corresponding to the user who has performed the operation for specifying the item.

20. An information processing method comprising:
   determining whether a plurality of pieces of first and second information have been accumulated;
   in response to the determining, specifying each piece of first information indicating a document and an order of processes of a certain operation performed on the document, and a corresponding piece of second information indicating a result of the certain operation in terms of a plurality of items, wherein one of the plurality of items is based on an operation performed by the user; and
   outputting a piece of first information corresponding to a piece of second information for which the result of the certain operation meets a condition in terms of the specified item among the plurality of pieces of first and second information.

\* \* \* \* \*